US007798396B1

(12) United States Patent
Moreland et al.

(10) Patent No.: US 7,798,396 B1
(45) Date of Patent: Sep. 21, 2010

(54) METHOD FOR CLEANING COMPONENTS OF A CASH CONTROL SAFE

(75) Inventors: Flynt M. Moreland, Plano, TX (US); Todd Dillen, Coppell, TX (US)

(73) Assignee: Tidel Engineering, L. P., Carrollton, TX (US)

( * ) Notice: Subject to any disclaimer, the term of this patent is extended or adjusted under 35 U.S.C. 154(b) by 661 days.

(21) Appl. No.: 11/750,390

(22) Filed: May 18, 2007

(51) Int. Cl.
*G06F 9/00* (2006.01)

(52) U.S. Cl. .................................................... 235/379

(58) Field of Classification Search ................. 235/379, 235/381; 902/8; 705/43
See application file for complete search history.

(56) References Cited

U.S. PATENT DOCUMENTS 4,650,980 A * 3/1987 Mizutani .................... 235/380
5,676,456 A 10/1997 Sharp
6,736,251 B2 5/2004 Molbak
6,983,880 B2 1/2006 Graef et al.
7,131,576 B2 11/2006 Utz et al.
7,131,580 B2 * 11/2006 Molbak ...................... 235/379
7,140,607 B2 11/2006 Graef et al.
7,150,392 B2 12/2006 Utz et al.

FOREIGN PATENT DOCUMENTS

JP 02244296 A * 9/1990

* cited by examiner

*Primary Examiner*—Seung H Lee
(74) *Attorney, Agent, or Firm*—Locke Lord Bissell & Liddell, LLP

(57) ABSTRACT

A method for cleaning a cash interface device of a cash control safe includes establishing a cash interface device cleaning frequency. The number of operations of the cash interface device is counted. Comparison between the counted number of operations of the device is made to the established cleaning frequency. A notice is provided to an operator when the counted number of operations of the device exceeds the established frequency indicating a need for a cleaning operation for the device.

3 Claims, 2 Drawing Sheets

METHOD FOR CLEANING COMPONENTS OF A CASH CONTROL SAFE

TECHNICAL FIELD OF THE INVENTION

The present invention relates to cash control safes, and more particularly to a method for cleaning components of a cash control safe.

BACKGROUND OF THE INVENTION

Cash control safes include various components, such as for example, note acceptors (bill validators), coin hoppers (coin dispensing mechanisms), note dispensers, and coin sorting mechanisms that require periodic cleaning. A note acceptor includes sensors and drive wheels which accumulate dirt from paper dust, ink and dirt which adheres to the notes. This accumulation of dirt effects the proper operation of a note acceptor. Similarly, coin hoppers, note dispensers and coin sorters include sensors and other devices which fail when dirty.

A need has thus arisen for a method for cleaning components of a cash control safe to ensure reliable operation thereof.

SUMMARY OF THE INVENTION

In accordance with the present invention, a method for cleaning a cash interface device of a cash control safe is provided. A cash interface device cleaning frequency is established. The number of operations of the cash interface device is counted. Comparison between the counted number of operations of the device is made to the established cleaning frequency. A notice is provided to an operator when the counted number of operations of the device exceeds the established frequency indicating a need for a cleaning operation for the device.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

As used herein, the term "cash interface device" will include, but is not limited to, a note acceptor, bill validator, coin hopper, coin dispense mechanism, note dispenser or coin sorting mechanism. As used herein the term "operation" will refer to operation of a cash interface device, including, but not limited to, the acceptance of a note, dispensing of a coin, validating a bill, or sorting coins.

Figure 1:
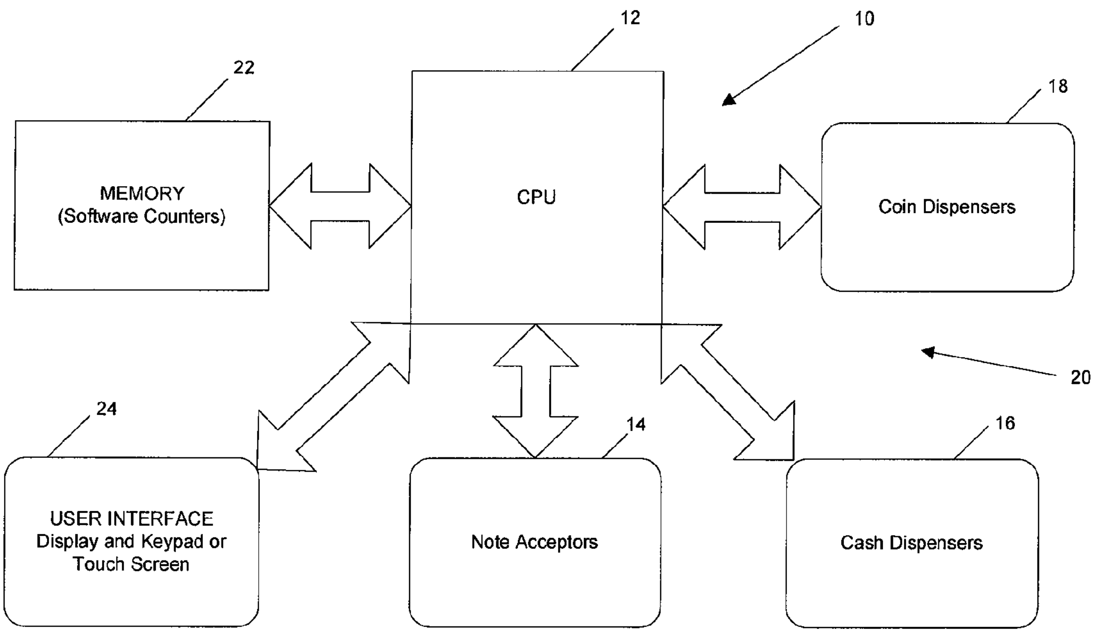
FIG. 1 is a block diagram of a cash control safe.

Referring to FIG. 1, a typical cash control safe, such as for example, a drop safe is illustrated, and is generally identified by the numeral 10. Safe 10 may comprise, for example, a secure housing intended for mounting near a location of cash transactions, such as a point-of-sale terminal or conventional cash register. A central processing unit 12 is associated with safe 10 and receives and generates data signals concerning the amount of currency receives and dispensed. Central processing unit 12 interfaces with a note acceptor 14, cash dispenser 16 and coin dispenser 18. Note acceptor 14, cash dispenser 16 and coin dispenser 18 are collectively referred to herein as cash interface devices 20.

The number of operations of cash interface devices 20 is counted and stored in a memory 22. Operators and users of safe 10 interface with central processing unit 12 utilizing, for example, a user interface 24 which may comprise, for example, a key pad or touch screen. User interface 24 also includes a display for displaying notices generated by central processing unit 12.

Central processing unit 12 in combination with memory 22, counts and stores the number of operations of a cash interface device associated with cash control safe 10.

Figure 2:
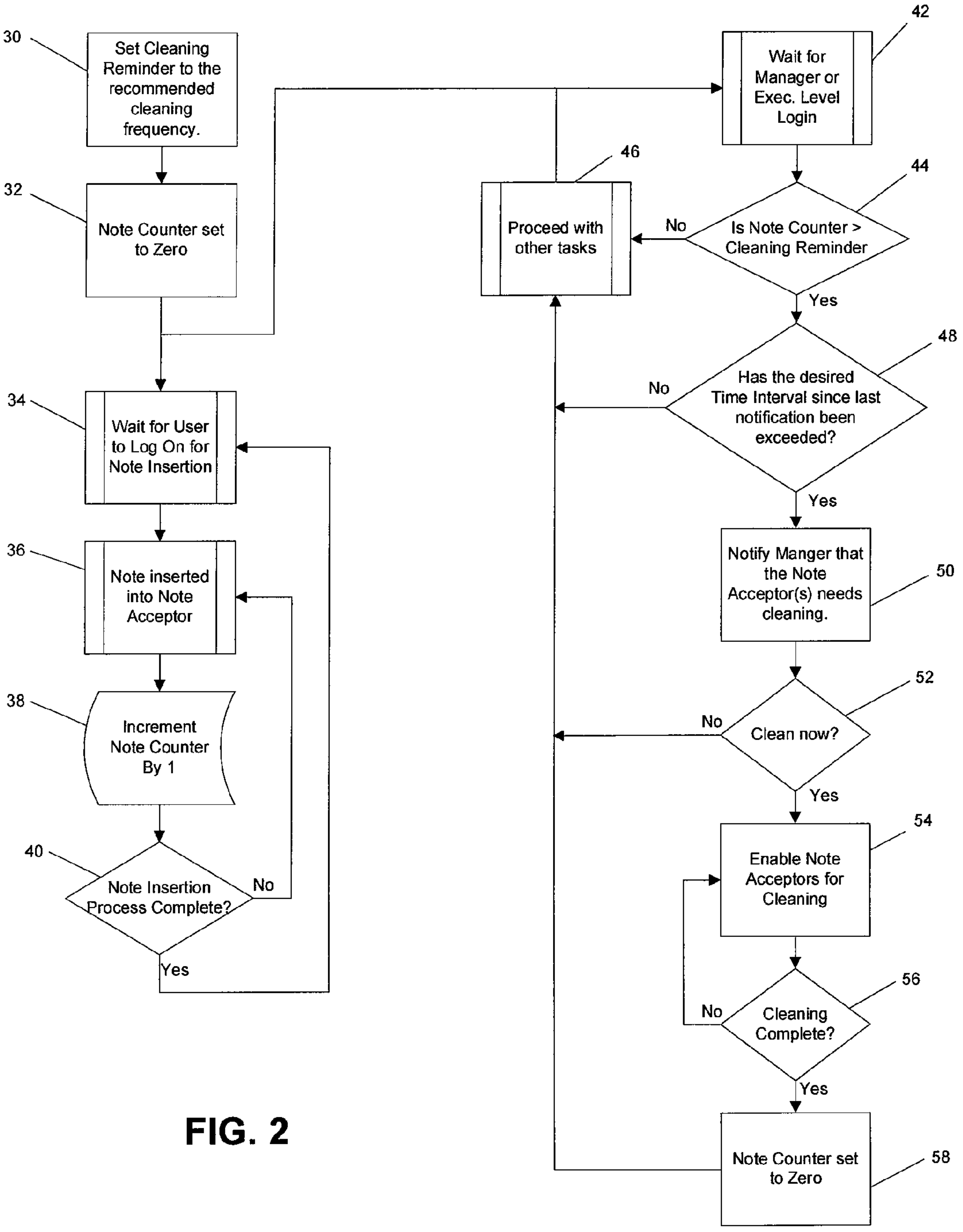
FIG. 2 is a flow diagram illustrating the present method.

Referring to FIG. 2, the present method will now be described. At step 30, the cleaning frequency of a cash interface device 20 is established and input by an operator via interface 24 to central processing unit 12. The description of the present method with respect to FIG. 2 will be described in connection with a note or bill acceptor, it being understood that the present method is applicable to any type of cash interface device associated with a cash control safe.

At step 32, a note counter is set to zero within memory 22. A user or operator logs onto cash control safe 10 at step 34. A note or bill is inserted into a note acceptor 14 of cash control safe 10 at step 36. The counter included within memory 22 is then incremented by one at step 38. A decision is then made at decision step 40 to determine if note insertion has been completed. If the decision is no, additional notes are inserted into note acceptor 14 at step 36 and the counter is incremented by one for each note inserted. At step 40, if the decision is yes, the flow returns to step 34.

After the note counter is set to zero, at step 32, the method waits for a manager or executive level log in at step 42. A decision is made at decision step 44 to determine if the note counter count of inserted notes is greater than the cleaning frequency count established at step 30. If the decision is not at decision step 44, the cash control safe 10 proceeds with other tasks at step 46.

If the note counter count exceeds the cleaning frequency, at decision step 44, a determination is made at decision step 48 to determine if the desired time interval since the last operator notification has been exceeded. If the decision at step 48 is no, the flow returns to step 46.

If the decision at decision step 48 is yes, a notification is generated by central processing unit 12 to notify the manager that the note acceptor 14 requires cleaning at step 50. This notification is provided to the manager via the display of interface 24.

At decision step 52, a decision is made by the manager whether to clean the note acceptor 14. If the decision is no, the flow returns to step 46. In this manner, the manager can defer cleaning the note acceptor until a later time. If the decision at decision step 52 is yes, the note acceptor 14 is enabled for cleaning at step 54. At step 54, instructions may be generated by central processing unit 12 and displayed to the manager via interface 24 as to the type of cleaning and the procedure for cleaning the note acceptor 14. At decision step 56, a decision is made as to whether the cleaning is complete. If the decision is no, the flow returns to step 54. If the decision is yes, the note counter within memory 22 is reset to zero at step 58 and the flow returns to step 46.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A method for cleaning a cash interface device of a cash control safe comprising:

establishing a cash interface device cleaning frequency;

counting the number of operations of the cash interface device;

comparing the counted number of operations of the cash interface device to the established cleaning frequency;

providing an operator a notification of a need for a cleaning operation of a cash interface device when the counted number of operations of the cash interface device exceeds the established cleaning frequency and delaying a cleaning operation in response to the operator notification.

2. The method of claim 1 and further including:

providing a reminder notification after a pre-determined amount of time has elapsed since issuance of a prior operator notification.

3. The method of claim 1 and further including:

providing instructions for the cleaning operation upon issuance of an operator notification.

* * * * *